United States Patent Office 2,971,526
Patented Feb. 14, 1961

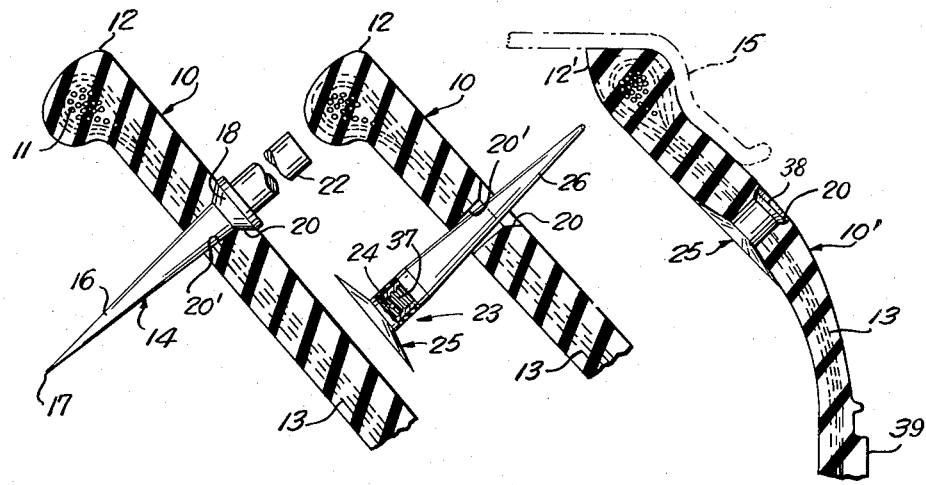
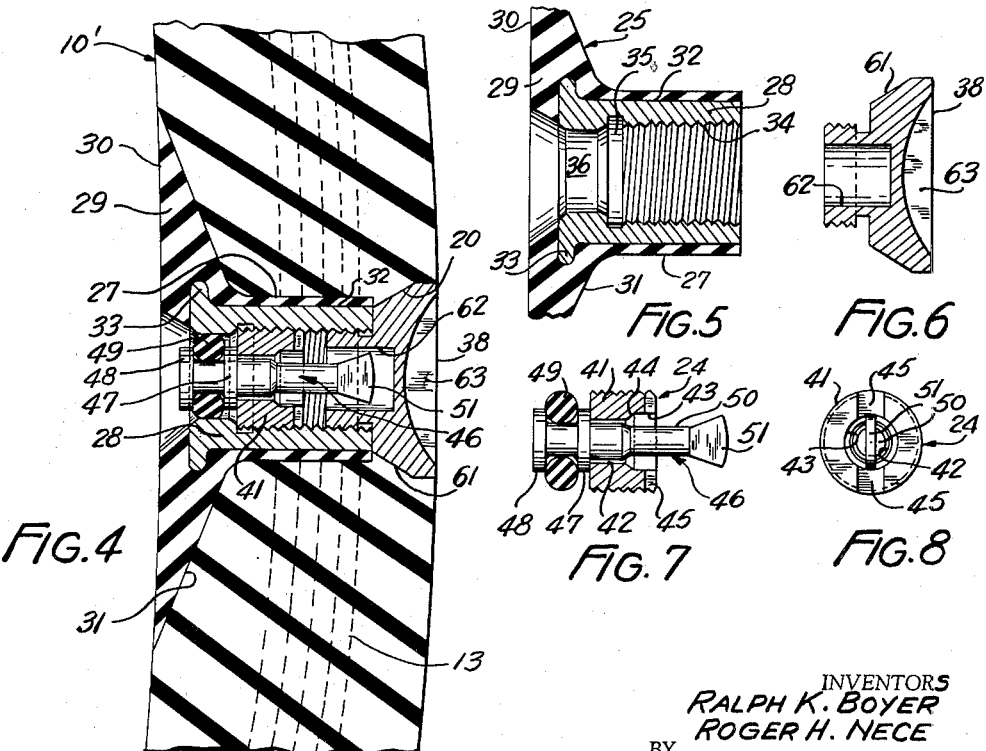

---

2,971,526

SIDEWALL VALVE FOR TUBELESS TIRES

Ralph K. Boyer, Cleveland, and Roger H. Nece, Maple Heights, Ohio, assignors to The Dill Manufacturing Company, Cleveland, Ohio, a corporation of Ohio Filed Jan. 6, 1958, Ser. No. 707,423

2 Claims. (Cl. 137—223)

The present invention relates to a valve in a tubeless tire or the like.

An object of the present invention is to provide a valve for inflating a tubeless tire which can be assembled with the tubeless tire before the vulcanization thereof and obviates the necessity for costly, time consuming assembly of a valve with a tubeless tire after the vulcanization thereof or in a wheel rim, as is conventional in the usual tubeless tire and wheel assemblies.

Another object of the present invention is to provide a valve in a tubeless tire in such a position that the valve is easily accessible for maintenance purposes and yet the portion of the tire containing the valve is not unduly subject to flexing, bending, and other deformities occurring during the use of the tire.

Yet another object of the present invention is to provide a valve for mounting in the sidewall of a tubeless tire which obviates the necessity for a hole in a wheel rim and a rim valve therein, as well as a hole in a wheel cover or disk for accommodating the rim valve. Heretofore, a rim valve has been required for a tubeless tire and wheel assembly which is not only costly to manufacture and assemble, but presents a serious sealing problem, as well. Moreover, a troublesome difficulty has resided in the use of a wheel cover having a hole therein for accommodating a rim valve extending therethrough, wherein the wheel cover has had a tendency to slip relative to the wheel, so that the rim valve has been forced out of the hole in the wheel cover, with the result that the wheel cover must be removed and repositioned at intervals for providing easy access to the rim valve.

Another object of the present invention is to provide a completely assembled valve for a tubeless tire which valve assembly has been completely installed in the tire before it has been cured or vulcanized and after the foregoing installation no other operations are necessary to complete the valve assembly.

Another object of the present invention is to provide a sidewall valve having a stem for bonding within the wall of a fluid pressure container during the manufacture thereof.

Another object of the present invention is to provide a valve for a tubeless tire which can be fully assembled with the tire when the tire is vulcanized and molded, which valve is completely flush with and does not protrude beyond the adjoining portion of the tire's outer surface either before or after assembly therewith for a smooth and uninterrupted outer tire wall surface.

Another object of the present invention is to provide a valve for a fluid pressure container for bonding in the wall thereof during the manufacture of the fluid pressure container, which valve is provided with an O-ring sealing means for preventing the escape of fluid through the valve from the fluid pressure container.

The invention further resides in certain novel features of construction, and combinations and arrangements of parts, and further objects and advantages thereof will be apparent to those skilled in the art to which it pertains from the following description of an embodiment thereof described with reference to the accompanying drawings in which similar reference characters represent corresponding parts throughout the several views, and in which:

Fig. 1 is a fragmentary cross-sectional view of an outer sidewall of a tubeless tire carcass immediately before the vulcanization thereof with an awl-like tool inserted therein;

Fig. 2 shows a completely assembled valve in a valve stem being pulled through the opening formed in the tire carcass wall of Fig. 1;

Fig. 3 shows the tire of Figs. 1 and 2 with the completely assembled valve in place after vulcanizing;

Fig. 4 is an enlarged fragmentary sectional view of Fig. 3 showing the valve in sealing or closed position;

Fig. 5 is a cross-sectional view of the valve stem;

Fig. 6 is a cross-sectional view of the valve cap;

Fig. 7 is a cross-sectional view of the valve; and

Fig. 8 is an end view of Fig. 7.

Before describing in detail the method and preferred embodiment of the present invention it is to be understood that the invention is not limited in its application to the details of construction and arrangements of parts shown in the accompanying drawings, and the invention is capable of other embodiments. It is to be understood also that the phraseology or terminology employed herein is for the purpose of description and not of limitation, and it is not intended to limit the invention herein claimed beyond the requirements of the prior art.

Referring now to Fig. 1, reference numeral 10 indicates generally an unvulcanized or uncured tubeless tire carcass made of an elastomer having the usual soft, deformable consistency with strands of wire reinforcing members 11 forming an annular bead 12 of the tire carcass. The terminal ends of a plurality of strands of nylon cord, fabric, or the like, 13, are wrapped or looped around the wire strands 11 and disposed within the elastomeric body or carcass of the tire 10. It is to be understood that the reinforcing fabric need not be of nylon, but can be of any desirable material and that the tire carcass can be partially vulcanized or semi-cured so long as the physical characteristics thereof permit the method to be carried out. A tool 14 is inserted into the tire wall near the upper annular bead 12 from the outer side of tire 10 but far enough from the bead 12 to be free of a wheel rim with which the tubeless tire will be ultimately assembled. For example, a fragmentary portion of a wheel rim 15 is shown schematically in Figure 3 for illustrating the general disposition thereof relative to a fully vulcanized or cured tire 10'.

The tool 14 comprises an awl portion 16 having a blunted or rounded end 17 for preventing the breaking or shearing of the nylon cords or threads 13 in the tire carcass 10 when the tool 14 is being inserted. The tool 14 is worked into the sidewall of the tire 10, but care is taken that the nylon threads 13 are wedged apart and not pierced or broken during this process. A prying motion is imparted to the awl 16 by the operator thereof in order to insert the blunted end between the cords 13.

A frusto-conical flange portion 18 is disposed rearwardly of the tip of the conical awl portion 16 for forming a countersink or flared mouth 20 in the mouth of tapered opening 20' of the tire carcass 10. A handle 22 extends rearwardly of the flange 18 for the convenience of the operator of the tool 14.

A valve assembly 23 comprising a valve core 24 in a valve stem 25, is secured to a valve inserting needle 26 for inserting and pulling the valve assembly 23 into the substantially cylindrical opening 20' from the inside of the tire carcass 10.

The valve stem 25 is preferably composed of an outer tubular body portion 27 and a metal insert 28, the body portion 27 being preferably made of a soft elastomer with a flaring flange 29 at one end thereof. An outer face 30 of flange 29 is generally flat and an inner face 31 thereof is beveled or conical in configuration for a purpose to be later described.

The metal insert 28 is preferably comprised of a cylindrical outer surface 32 with a radial flange 33 at one end thereof, the cylindrical surface 32 and radial flange 33 being enclosed by and bonded to the vulcanized tubular body portion 27. The elastomeric body 27 and more particularly, the flaring flange portion 29 extends radially inwardly in a manner to substantially enclose the adjacent end face of insert flange 33. One end of the inner wall of the metal insert 28 is provided with threads 34 and a thread runout or undercut portion 35 at the inner end thereof. A passageway 36 of a coaxial cylindrical configuration having beveled portions at the ends thereof is formed in the insert 28 for a purpose to be described.

The conical needle 26 is provided with an annular threaded sleeve 37 of reduced diameter at the large end thereof for being threaded into the composite valve stem 25 and over the valve core 24, the valve stem 25 having been buffed and cemented in a manner well known in the art. The valve assembly 23 is then pulled in the opening 20' formed in the tire carcass 10 so that the conical face 31 of flange 29 is embedded in the carcass' inner wall and the outer face 30 of flange 29 is made flush therewith so that no part of the valve assembly 23 protrudes substantially beyond the inner wall of the carcass 10 for affecting a curing bag or an inner tire in case the valve assembly is used in dual chamber tires. The valve stem 25 is of sufficient length to have an end face in juxtaposition with the inner edge of the wall forming mouth 20.

The needle 26 is removed by the unthreading thereof from the valve stem 25 with the valve core remaining in assembly with the valve stem 25 during the entire operation. A valve cap 38, Figs. 4 and 6, is then screwed into the valve stem 25 in place of the needle 26 until the cap 38 engages the wall of the flared mouth 20 in the tire carcass 10 and made flush therewith so that no part protrudes beyond the outer surface of the tire carcass. The tire carcass 10 is then ready for vulcanizing in the tire mold or cooker. As is well known to those skilled in the art of making tires, an air-filled curing bag of doughnut or torus configuration is then placed inside the tire carcass 10 and both are placed in the tire mold for the vulcanization and molding of the tire carcass 10. During the cooking process the torus shaped air bag is inflated and expanded for pressing the tire carcass 10 against the contour of the mold and, as a result of the foregoing cooking process, the valve insert 25 is vulcanized to or fused with the tire.

The vulcanized tire 10', as shown immediately after removal from the mold in Fig. 3, has a completely formed bead 12' and a scuff flange 39 with the valve stem 25 vulcanized within the sidewall of the tire 10' between the bead 12' and scuff flange 39. Upon removal of the vulcanized tire from the mold, the flashovers and burrs are removed from the top of the valve cap by buffing, as a part of the normal process of buffing to remove the spikes of rubber around the tire periphery created by air vent holes in the tire mold. Moreover, a large percentage of the passenger car tires are presently white sidewalled and consequently require that the sidewalls thereof be buffed and cleaned after leaving the mold so that the buffing operation for removing the burrs and flashovers obstructing the valve cap is not, in essence, an added operation or step. The tire is complete and ready for use after buffing, since no more or additional operations need be performed on the valve, the valve being completely assembled before the tire carcass 10 is placed in the cooker, as pointed out above.

Moreover, due to vast improvements and technological development of recent years, tubeless tires are inflated at the factory, after assembly with a wheel or wheel rim, by breaking the tire bead away from the wheel rim and inflating the tire through the opening formed therebetween. When the foregoing method of tire inflation is used, it is not necessary to inflate the tire by using the sidewall valve and many unnecessary and time consuming operations or steps of manufacture are eliminated.

From the above it is apparent that the sidewall valve is assembled with the tire before it is vulcanized and remains in assembly with no further operations being performed after the normal buffing process, the buffing operation itself being considered necessary only insofar as the eye appeal of the finished product is concerned.

Referring to Fig. 7, a preferred form of the valve core 24 is comprised of an externally threaded bushing 41 having a cylindrical aperture or port 42 formed coaxially therein at one end thereof. The other or outer end of port 42 is enlarged and is comprised of a cylindrical wall 43 connected to the port 42 by means of a beveled wall 44. A pair of transverse or diametrically extending slots 45 are formed in the outer end of bushing 41 for receiving a tool such as a screw driver or spanner wrench, not shown, when the valve core 24 is threaded and tightened within the valve stem 25. The other end of the bushing 41 is flat for a purpose to be described.

A valve pin 46, having a central portion with a diameter slightly less than the diameter of port 42, a provided with a pair of radially extending, axially spaced apart flanges 47 and 48 at one end thereof. The flanges 47 and 48 extend radially beyond the port 42 for retaining an O-ring 49, concentrically disposed about the valve pin 46. The O-ring is made of an elastomeric material which can withstand the temperatures reached in the curing or cooking process which is approximately 280 to 300° F. The term elastomeric, as used herein, is considered to include natural rubber as well as synthetic materials having characteristics or properties akin to those of natural rubber. One radial face of flange 47 is adapted to abut with the flat end wall of bushing 41 for restricting port 42. The valve pin 46, on the other end thereof, is provided with an extension or guide pin 50 of reduced diameter connected thereto having an outer end 51 flattened to a transverse dimension greater than the diameter of port 42, so as to prevent the pin 46 from being removed or lost, the flattened portion 51 being formed after the pin 46 has been assembled with the bushing 41. The foregoing valve 24 is removable by threading the same out of valve stem 25 from the outside of the tire 10' and can be replaced by similarly threading a new valve into the stem 25 if it is found to be defective.

As hereinabove pointed out, a tool which can be in the form of a spanner wrench is inserted into the slots 45 and the valve core 24 is then threaded into the valve stem 25 with the O-ring 49 sealingly engaging the wall of passageway 36.

In order to inflate, deflate or gauge the tubeless tire after it has been mounted on a wheel, the valve cap 38 is removed, a mechanical extension of conventional configuration, not shown, is threaded into the stem 25, Fig. 4, and pressure fluid such as compressed air is forced through the valve from right to left. Accordingly, a pin, which is an integral part of the mechanical extension, depresses the valve pin 46 and forces it along with the O-ring seal 49 to the left and out of the passageway 36 in stem 25, and the guide pin 50, of small diameter, is drawn into port 42 for permitting air to be forced through port 42 into or out of the tire 10'. Upon releasing or discontinuing the supply of air into the tire 10', the air within the tire will act against the exposed surfaces of flange 48 and the O-ring 49 and force the valve pin 46, as well as the O-ring 49, to the right in such a manner that the radial flange 47 abuts against the flat end wall of bushing 41, restricts port 42, and closes the passageway 36. The O-ring 49, carried by the valve pin 46, is forced into the passageway 36 by the compressed air and squeezed or radially compressed between and in sealing relationship with the walls forming passageway 36 and the valve pin 46.

A dust cover is provided in the form of the cap 38, Figs. 4 and 6, threaded into the outer end of valve stem 25, which cap serves to further restrict leakage of air, if any, through the valve port 42. The cap 38 comprises an annular conical wall 61 sufficiently large for tightly engaging the flared or conical portion of opening 20 in the finished tire 10'. The cap 38 has a cylindrical bore 62 coaxially formed in its inner end of sufficient size to receive the flattened end 51 of valve pin 46 when in assembled relationship therewith. The outer end of cap 38 has an arcuate slot 63 formed therein to permit the cap to be threaded in and out of the stem 25 with a tool such as a coin or screwdriver. Preferably, the cap is made of stainless steel for being assembled in the valve stem 25 with the aid of a screwdriver, not shown, having a magnetized tip made to engage slot 63.

While I have shown and described a specific embodiment in accordance with my invention, it is understood that the same is susceptible of many changes and modifications, as known to a person skilled in the art, and I intend to cover all such changes and modifications reasonably embraced by the scope of the claims hereof.

Having thus described my invention, what I claim is:

1. A valve for a tubeless tire or the like having a sidewall, said valve comprising an elastomer sleeve having a flaring conically shaped flange at one end, a tubular metal insert having a peripheral flange at one end and secured in said sleeve with said peripheral flange covered by said flaring flange of said sleeve, said tubular insert having an internally threaded portion and a passageway having a cylindrical wall coaxially aligned with said threaded portion, said passageway having outwardly beveled ends and being spaced from said threaded portion by a thread runout portion of said tubular insert, a threaded bushing element engaged in said threaded portion and having a port therethrough, a valve pin extending through said port in said bushing and reciprocable therein, said valve pin having one end thereof extending into said passageway and having a pair of spaced flanges thereon, the other end of said valve pin being larger in size than said port, and resilient sealing means carried by said valve pin and disposed between said flanges, said sealing means being movable into and out of said passageway at either end thereof for replacement of said sealing means and control of said passageway by reciprocation of said valve pin, one of said flanges being adapted to abut said bushing and to close said port when said sealing means is in said passageway.

2. A valve for a tubeless tire or the like having a sidewall, said valve comprising an elastomer sleeve having at one end an enlarged thickened head flange, a tubular rigid insert having at one end a peripheral flange embedded in said head flange, said tubular insert having an internally threaded portion adjacent its opposite end and a cylindrical passageway coaxial with said threaded portion and adjacent said one end and in proximity to said peripheral flange, a threaded bushing screwed in said threaded portion of said insert and having a port therethrough, a valve pin extending through said port in said bushing and reciprocable therein and having one end thereof extending into said passageway and provided with a pair of axially spaced flanges of larger diameter than said port but of smaller diameter than said passageway, and a resilient O-ring sealing means mounted on said valve pin between said flanges and engaged thereby, said O-ring sealing means extending beyond the circumferences of said flanges a substantial distance, said sealing means being movable by reciprocation of said valve pin into and out of said passageway for sealing the same, one of said flanges when said sealing means is in said passageway abutting the inner end of said bushing.

References Cited in the file of this patent
UNITED STATES PATENTS

| | | |
|---|---|---|
| 603,510 | MacSpadden | May 3, 1898 |
| 647,742 | Brewster et al. | Apr. 17, 1900 |
| 1,200,358 | Iorns | Oct. 3, 1916 |
| 1,313,554 | Nielsen | Aug. 19, 1919 |
| 1,822,592 | Hutchinson | Sept. 8, 1931 |
| 1,926,263 | Christopherson | Sept. 12, 1933 |
| 1,933,705 | Christopherson | Nov. 7, 1933 |
| 2,154,255 | Williams | Apr. 11, 1939 |
| 2,473,591 | Killner | June 21, 1949 |